D. H. STUDWELL.
FISHING REEL.
APPLICATION FILED MAR. 8, 1909.
929,341.
Patented July 27, 1909.
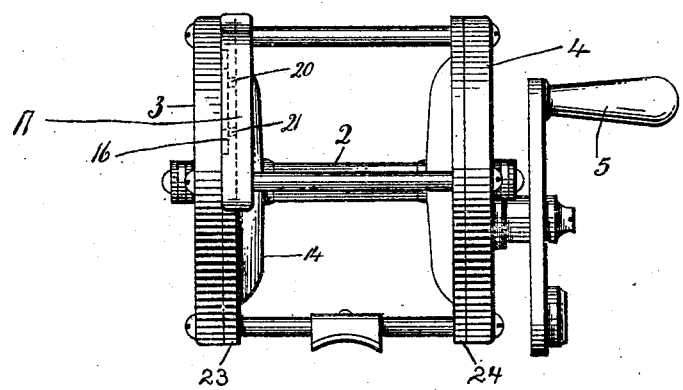
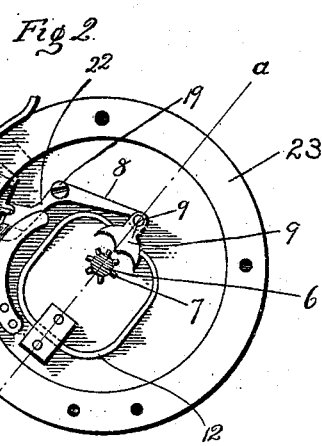
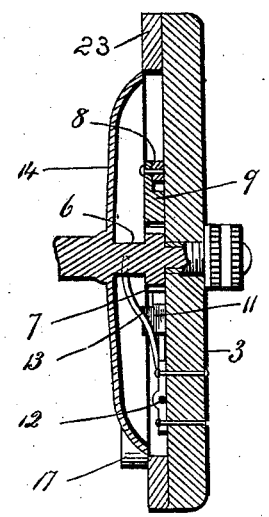
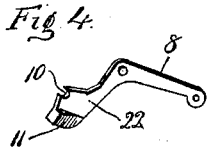

UNITED STATES PATENT OFFICE.

DAVID H. STUDWELL, OF NEW HAVEN, CONNECTICUT.

FISHING-REEL.

No. 929,341.  Specification of Letters Patent.  Patented July 27, 1909.

Application filed March 8, 1909. Serial No. 482,084.

*To all whom it may concern:*

Be it known that I, DAVID H. STUDWELL, a citizen of the United States, residing at New Haven, in the county of New Haven and State of Connecticut, have invented a new and useful Improvement in Fishing-Reels; and I do hereby declare the following, when taken in connection with the accompanying drawings and the numerals of reference marked thereon, to be a full, clear, and exact description of the same, and which said drawings constitute part of this specification, and represent, in—

Figure 1 a side view of a reel constructed in accordance with my invention. Fig. 2 an inside view of the outer plate. Fig. 3 a vertical section through this plate showing a portion of the spool and on an enlarged scale. Fig. 4 a perspective view of the operating lever, detached.

This invention relates to an improvement in fishing reels and particularly to that class which are provided with a so called click and a drag. In the more general construction of fishing reels the click and drag are operated by independently arranged buttons, although they have been operated by a single means.

The object of this invention is a particularly simple arrangement of parts whereby both the click and drag are operated by a single slide arranged at a convenient point; and the invention consists in the construction hereinafter described and particularly recited in the claims.

As shown in the drawings the reel comprises a spool 2 mounted between the plates 3, 4, the spool being driven by the handle 5 directly engaged with the spool or through intermediary gears by which the spool may be rapidly turned. On the shaft 6 of the spool is a toothed wheel 7 and mounted on the inner face of the plate upon a pivot 19 is a lever 8 carrying a pivotally arranged pawl 9 which is adapted to be engaged with the toothed wheel 7. This lever 8 is formed with an arm 22 and in the upper edge of this arm 22 are a notch 10 and a cam-surface 11 for the purpose as will hereinafter appear. Secured to the plate 3 is a bowed wire spring 12 the ends of which engage on opposite sides of the pawl 9 and these sides are beveled so that the action of the spring is to draw the pawl toward and into engagement with the toothed wheel 7. Also secured to the inner face of the plate 3 is a drag spring 13 the end of which is adapted to engage with the end 14 of the spool and so as to exert a friction to retard the movement of the spool. This spring finger extends across the path of the cam surface 11 of the pawl 9. The central portion of the plates 3 and 4 is recessed. As herein shown, the recesses are formed by rings 23 and 24 secured to the respective plates 3 and 4, and in the edge of the ring 23 is a slot 16, through which a slide 17 extends. This slide is formed with a lug 18 adapted to coact with the arm 22 of the lever. This slide 17 is provided with a long finger-piece so as to be easily operated. This lug 18 resting in the notch 10 holds the ratchet 9 out of engagement with the toothed wheel 7 and so that the spool will run free. If the slide is moved in one direction or toward the cam surface 11 that cam surface will be forced beneath the drag spring 13 and crowd that spring against the end of the spool so as to apply the drag. When the slide is moved in the opposite direction so that the lug 18 passes beyond the notch 10 which permits the lever 8 to turn, and under the action of the spring 12 the pawl 9 is forced into the path of the toothed wheel 7 and so that as that wheel revolves the pawl will ride over the teeth and produce the necessary clicking sound. The slide 17 may be held in place by providing it with ears 20 and 21 which are turned up inside the wall of the recess in the plate. It will be noticed that the thumb piece is in position to be engaged by the thumb of the left hand so that as the reel is held either the click or drag may be readily turned into engagement, or both thrown out of operative position by a single instrumentality.

I claim:—

1. A reel comprising a frame, a spool mounted therein the end of the spool provided with a toothed wheel, a lever mounted in the frame, said lever carrying a ratchet adapted to be moved into the path of said toothed wheel, said lever formed with an arm, a drag spring mounted in the frame and adapted to be moved into engagement with said spool, said lever formed with an arm adapted to engage with said drag spring, a spring engaging with said ratchet and a slide adapted to turn said arm whereby either the drag spring or ratchet may be thrown into operative position.

2. A fishing reel comprising a frame, a spool mounted therein, the end of the spool provided with a toothed wheel, a lever pivoted in the frame and formed with an operating arm, said arm including a cam surface, a ratchet pivoted to said lever, a bowed spring the ends of which bear on opposite sides of said ratchet, a drag spring extending across the path of the movement of said cam, a slide adapted to turn said arm, said slide provided with a finger-piece.

3. A fishing reel comprising a frame, a spool mounted therein, the end of the spool provided with a toothed wheel, a lever pivotally mounted in said frame and formed with an operating arm provided with a cam surface and a notch, a ratchet pivotally connected with said lever, a bowed spring the ends of which engage with opposite sides of said ratchet, a drag spring pivoted to the frame and extending across the path of movement of said cam, and a slide mounted in the frame and formed at its inner end with a lug adapted to engage with the arm of the lever whereby the lever may be turned, said slides provided with a finger-piece.

In testimony whereof, I have signed this specification in the presence of two subscribing witnesses.

DAVID H. STUDWELL.

Witnesses:
EDWARD P. ALLEN,
FRED. A. GRIMLEY.